(12) United States Patent
Chang et al.

(10) Patent No.: US 10,289,331 B2
(45) Date of Patent: *May 14, 2019

(54) ACCELERATION AND DYNAMIC ALLOCATION OF RANDOM DATA BANDWIDTH IN MULTI-CORE PROCESSORS

(71) Applicant: Oracle International Corporation, Redwood City, CA (US)

(72) Inventors: Bruce J. Chang, Saratoga, CA (US); Fred Tsai, Cupertino, CA (US); John D. Pape, Cedar Park, CA (US)

(73) Assignee: ORACLE INTERNATIONAL CORPORATION, Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/143,013

(22) Filed: Sep. 26, 2018

(65) Prior Publication Data
US 2019/0026040 A1     Jan. 24, 2019

Related U.S. Application Data

(63) Continuation of application No. 15/370,440, filed on Dec. 6, 2016, now Pat. No. 10,114,572.

(51) Int. Cl.
*G06F 7/58* (2006.01)
*G06F 3/06* (2006.01)
(Continued)

(52) U.S. Cl.
CPC ............ *G06F 3/0631* (2013.01); *G06F 3/061* (2013.01); *G06F 3/0644* (2013.01); *G06F 3/0653* (2013.01); *G06F 3/0656* (2013.01); *G06F 3/0673* (2013.01); *G06F 7/588* (2013.01); *G06F 8/00* (2013.01); *G06F 9/5011* (2013.01)

(58) Field of Classification Search
None
See application file for complete search history.

(56) References Cited

U.S. PATENT DOCUMENTS

7,849,120 B2   12/2010   Henry et al.
8,219,602 B2   7/2012   Golic
(Continued)

*Primary Examiner* — David H Malzahn
(74) *Attorney, Agent, or Firm* — Marsh Fischmann & Breyfogle LLP; Jonathon A. Szumny; Kent A. Lembke (57) ABSTRACT

Systems and methods for use in enhancing and dynamically allocating random data bandwidth among requesting cores in multi-core processors to reduce system latencies and increase system performance. In one arrangement, a multi-core processor includes a vertical pre-fetch random data buffer structure that stores random data being continuously generated by a random data generator (RNG) so that such random data is ready for consumption upon request from one or more of a plurality of processing cores of the multicore processor. Random data received at one data buffer from a higher level buffer may be automatically deposited into the lower level buffer if room exists in the lower level buffer. Requesting strands of a core may fetch random data directly from its corresponding first level pre-fetch buffer on demand rather than having to trigger a PIO access or the like to fetch random data from the RNG.

23 Claims, 6 Drawing Sheets

(51) Int. Cl.
*G06F 8/00* (2018.01)
*G06F 9/50* (2006.01)

(56) References Cited

U.S. PATENT DOCUMENTS

| | | | |
|---|---|---|---|
| 10,114,572 B2 * | 10/2018 | Chang | G06F 9/5011 |
| 2012/0253780 A1 | 10/2012 | Talla | |
| 2014/0280411 A1 | 9/2014 | Rose | |
| 2017/0085654 A1 * | 3/2017 | Mikhailov | G06F 7/76 |
| 2018/0157435 A1 | 6/2018 | Chang | |
| 2018/0367516 A1 * | 12/2018 | Mundra | H04L 63/0428 |
| 2019/0026040 A1 * | 1/2019 | Chang | G06F 9/5011 |

* cited by examiner

ACCELERATION AND DYNAMIC ALLOCATION OF RANDOM DATA BANDWIDTH IN MULTI-CORE PROCESSORS

CROSS REFERENCE TO RELATED APPLICATION

This application is a continuation of U.S. patent application Ser. No. 15/370,440, entitled "ACCELERATION AND DYNAMIC ALLOCATION OF RANDOM DATA BANDWIDTH IN MULTI-CORE PROCESSORS," filed on Dec. 6, 2016, issued as U.S. Pat. No. 10,114,572, the entirety of which is incorporated herein by reference as if set forth in full.

BACKGROUND

1. Field of the Invention

The present invention generally relates to the field of random data generation in computer systems and, more particularly, to the allocation of random data bandwidth among a plurality of processing cores in a processing device.

2. Relevant Background

In many applications in the field of computers and other electronic devices, there is a need for a physical source of true random data such as random numbers and/or random symbols. Such applications include computer simulations of various probabilistic algorithms and processes (e.g., Monte Carlo numerical analysis), computer games, cryptographic algorithms and protocols whose security relies on the ability to generate unpredictable secret keys. High-speed truly random sequences are also needed for setting up countermeasures against so-called side-channel attacks that target specific electronic devices (e.g., microelectronic devices, security schemes, integrated chip cards). For example, such countermeasures include random masking of cryptographic functions as well as generation of secret keys for the encryption of internal links and memories in such devices.

In this regard, microprocessors typically include or otherwise incorporate a Random Number Generator (RNG) whose output is typically a binary sequence that, in principle, needs to be unpredictable in the sense of the information theory. Stated differently, it should be possible to statistically model the RNG output as a purely random sequence, i.e., a sequence of mutually independent, uniformly distributed binary random variables (bits), with maximal possible entropy per bit. In particular, it should be computationally infeasible to distinguish the RNG output sequence from a purely random sequence or, equivalently, it should be computationally infeasible to predict the RNG output sequence.

Microprocessors that include two or more independent processing cores manufactured on a single chip or integrated circuit die are often referred to as multi-core processors and may be implemented as a System on a Chip (SoC). Each core can read and execute program instructions (e.g., add, move data, branch) and the multiple cores can run multiple instructions at the same time to increase overall speed for programs amenable to parallel computing. The various cores can sometimes share one or more common caches and may implement message passing or shared-memory inter-core communication methods. Common network topologies to interconnect cores include bus, ring, two-dimensional mesh, and crossbar.

SUMMARY

In existing microprocessors, a user's access to random data is typically through a device driver which reads the hardware RNG through a hypervisor call to trigger a program input/output (PIO) access to fetch random data (e.g., sequence of random numbers and/or symbols) from the RNG hardware. Broadly, a PIO access is a manner of transferring data between processing cores and peripheral devices such as network adapters, Advanced Technology Attachment (ATA) storage devices, and the like. However, PIO accesses have increased latencies compared to normal memory loads. Furthermore, existing RNG hardware does not generate random data until after a request for random data is made by a processor or core which further increases random data latency. Random data latency further increases in the case of multi-core processors when multiple cores running on different applications simultaneously require random data. In this case, random data PIO accesses from the various cores are serialized in the RNG hardware which severely degrades random data bandwidth and results in the bandwidth not being fairly allocated to each requesting core.

In view of at least the foregoing, disclosed herein are various utilities (e.g., systems, methods, etc.) for use in enhancing and dynamically allocating random data bandwidth among requesting cores in multi-core processors to reduce system latencies and increase system performance. The disclosed utilities make use of a vertical pre-fetch random data buffer structure to reduce random data latency and increase random data throughput in a multi-core processor (e.g., SoC including a plurality of processing cores). For instance, the vertical buffer structure may include a "first level" random data pre-fetch buffer on or associated with each core, a plurality of "second level" random data pre-fetch buffers, each of which services a subset of the cores, and a "third level" buffer associated with the RNG and which services the second level buffers. Initially, the RNG may be configured to constantly generate random data which may be temporarily deposited in the third level buffer and then dynamically transmitted upon request to the various second level buffers. Similarly, the random data in each second level buffer may be dynamically transmitted upon request from a core to the first level buffer of the core. Requesting strands of a core may then fetch random data directly from its corresponding first level pre-fetch buffer on demand rather than having to trigger a PIO access to fetch random data from the RNG. As used herein, "random number data" (RND) may refer to any appropriate combination(s) or sequence(s) of random numbers and/or random symbols unless otherwise specified herein.

In the case where a particular core has space available in its first level buffer, the core may be configured to automatically pre-fetch RND from its second level buffer. Similarly, when a particular second level buffer has available space (e.g., before the second level buffer is unable to satisfy a request for random data from a core), the second level buffer may be configured to automatically pre-fetch RND from the third level buffer. As mentioned previously, the RNG may be configured to constantly generate RND and deposit the same in the third level buffer but then drop the RND in the case where no requests for RND are received from the second level buffers. In the case where the second level buffers receive RND from the RNG but are already full, they may simply drop the RND until the next clock cycle. In addition to the vertical pre-fetch random data buffer structure, the various second level buffers also collectively make up a horizontal pre-fetch buffer structure that allows the RNG hardware to more fairly distribute RND bandwidth to the first level buffers of the respective cores.

In one arrangement, each second level buffer may include a First-In First-Out (FIFO) buffer memory with at least two logical partitions to hold the RND received from the RNG and make it available in a format directly usable by the first level buffers of the processing cores in a manner that conserves RND bandwidth. In the case where each processing core and its respective first level buffer is configured to request, process and/or store random data in 16-bit increments (e.g., widths), for instance, the second level buffer memory may be in the form of a 4×32 FIFO buffer memory (e.g., capable of simultaneously handling four, 32-bit streams of random data) that includes a first or lower half (partition) that is configured to store one half of an incoming stream (e.g., width) of RND from the RNG (e.g., 16 bits, such as bit[15:0]) and a second or upper half (partition) that is configured to store another half of the incoming stream (e.g., width) of RND from the RNG (e.g., 16 bits, such as bit[31:16]).

In the situation where only one of the subset of cores (e.g., a thread of the core) assigned to a particular second level buffer requests random data, a random data or partition selector (e.g. logic) of the second level buffer can select RND (e.g., 16-bit data in this example) from one of the first or second partitions during a first clock cycle (or phase) and send the same to the one core and then select random data (e.g., 16-bit data in this example) from the other of the first and second partitions during a next or subsequent clock cycle (or phase). Assuming only the one subset of cores is requesting RND, the random data selector can continue alternating between selecting random data from the first and second partitions in a "ping pong" type fashion which consumes less RND bandwidth as compared to RND requests from the core subset only being satisfied via a single partition or buffer (e.g., in which case the core would only be able to obtain random data every other clock cycle if one more subset of cores is requesting RND through the second level buffer), as compared to requesting RND from an RNG via a PIO access (in which case the RND is not generated until after the request), and the like. One or more multiplexers can be interfaced between the FIFO buffer memory and the random data selector to facilitate selection of random data from one of the partitions and then the other in this back and forth manner.

When two of the subset of cores are simultaneously requesting RND from the second level buffer, the random data selector may only select RND from one of the first and second partitions for the first core and only select RND from the other of the first and second partitions for the second core. In the case where a first core is requesting and obtaining random data (e.g., in the above-discussed ping pong fashion) and then a second core starts simultaneously making such requests which the random data selector would normally satisfy from the buffer partition currently satisfying the first core RND requests, the random data selector may defer satisfying the second core RND requests until a subsequent clock cycle.

Each second level buffer may include any appropriate prefetching logic that may be asserted to request RND from the RNG (e.g., from its third level buffer) when the FIFO buffer memory is not full and dropped or canceled when the FIFO buffer memory is full. A generic FIFO controller of the second level buffer may be configured to trigger the prefetching logic to assert or drop the RND requests to the RNG, drop any incoming data from the RNG when the FIFO buffer memory is already full, and advance the read pointer to the FIFO buffer memory when RND (e.g., a full 32-bit portion of random data) has been read and sent out to one or more cores.

Each core subset may be in the form of a core cluster made up of any appropriate number of cores (e.g., as one example, four cores per cluster). In one arrangement, each second level random data buffer may be configured to service a different pair of core clusters (e.g., eight cores in this example). To facilitate and satisfy random data requests and satisfaction of the same, each second level buffer may include a respective arbiter (e.g., logic) interposed between the random data selector and each core cluster. Specifically, the arbiter may be configured to receive RND requests from one or more cores of its particular core cluster and obtain RND via the random data selector for transmission back to the requesting core. For instance, a core may be configured to automatically submit RND requests to its particular arbiter when space is available in its respective first level data buffer (e.g., which may be before such random number data is requested or otherwise needed by a processing thread of the core).

In the case where one or more cores of a first cluster are requesting RND from the second level random data buffer but no cores of the second cluster are requesting RND from the second level random data buffer, the random data selector in conjunction with the multiplexer(s) may obtain and send RND from the first partition of the FIFO buffer memory and then from the second partition of the FIFO buffer memory in the ping-pong fashion to the first arbiter associated with the first cluster which may proceed to pass the same to the one or more requesting cores. The first arbiter may use any appropriate manner of satisfying RND requests from threads of more than one core (e.g., round robin, etc.). In one embodiment, the arbiter may be configured to send RND (e.g., 16-bit in this example) back to all of the cores in its cluster but include a "valid" bit turned "on" with the RND to only the core requesting the random data. In this case, any cores receiving RND with the valid bit turned off would just drop the received RND.

As mentioned previously, the FIFO controller of each second level buffer may trigger its prefetching logic to request RND from the RNG for receipt and storage in its FIFO buffer memory, where each piece of RND (e.g., each 16-bit portion of random data) is different than each other piece of RND. Somewhat similar to each second level buffer, the RNG may include, inter alia, a controller including an arbiter (logic) that is configured to receive RND requests from one or more of the second level buffers (e.g., upon determination by the FIFO controller of a second level buffer that its FIFO buffer memory has room for additional RND), obtain the same from the third level buffer (e.g., FIFO buffer memory) of the RNG, and send the same to the one or more requesting second level buffers according to any appropriate arbitration scheme (e.g., round robin, etc.). For instance, the arbiter may send the RND to all of the second level buffers but only include a valid bit along with the RND to one of the second level buffers. In the case where the RNG and various second level buffers are running on different domain buses at different speeds, the RNG may implement one or more appropriate synchronizers (e.g., "flip-flop" circuits) to synchronize the bit signals between the different domains. For instance, the FIFO buffer memory of the RNG may be implemented with two 64-bit flops and serve as the clock domain crossing (CDC) between the RNG macro or the like that actually generates the RND and the second level buffers.

In one aspect, a system on a chip (SoC) includes a substrate; a plurality of processing cores on the substrate, wherein each processing core includes a first level data buffer that is configured to store RND for consumption by processing threads of the processing core; a plurality of second level data buffers on the substrate, wherein each second level data buffer is configured to store RND for consumption by a different subset of the plurality of processing cores; and an RNG that generates RND for distribution to the plurality of second level data buffers.

As an example, second level data buffer may include a memory buffer (e.g., a First In First Out (FIFO) memory buffer) that is configured to store random number data distributed from the RNG. For instance, each memory buffer may include a plurality of partitions, where each partition is configured to store a different portion of the distributed RND during each clock cycle of the SoC. In one arrangement, each second level data buffer may include a random data selector that is configured to select the different portion of the distributed RND from at least one of the plurality of partitions and send the same for distribution to at least one of the different subsets of processing cores. For instance, the random data selector may be configured to alternately select the different portions of the distributed RND from the plurality of partitions during sequential clock cycles of the SoC and send the different portions for distribution to one of the different subsets of processing cores.

In another aspect, a method for use in a multicore processor includes determining, by a first of a plurality of processing cores of a multicore processor, that space is available in a first level RND pre-fetch buffer on the first processing core; requesting, by the first processing core in response to the determining, RND from a second level RND pre-fetch buffer on the multicore processor that services a first subset of the plurality of processing cores, wherein the first processing core is included in the first subset of processing cores; receiving, by the first processing core from the second level RND pre-fetch buffer in response to the requesting, RND; and storing the received RND in the first level RND pre-fetch buffer for use by processing strands on the first processing core.

In a further aspect, a method for use in a multicore processor includes receiving by a first of a plurality of second level RND pre-fetch buffers on a multicore processor, a request for RND from a first processing core of a plurality of processing cores on the multicore processor; returning to the first processing core, in response to the request received from the first processing core, RND from a random data memory buffer of the second level RND pre-fetch buffer; and storing, by the first processor core, the returned RND in a first level RND pre-fetch buffer of the first processor core for use by processing strands on the first processing core.

In addition to the exemplary aspects and embodiments described above, further aspects and embodiments will become apparent by reference to the drawings and by study of the following descriptions.

DETAILED DESCRIPTION

The present disclosure is generally directed to various utilities (e.g., systems, methods, etc.) for use in enhancing and dynamically allocating RND bandwidth among requesting cores in multi-core processors to reduce system latencies and increase system performance. As will be discussed, the disclosed utilities make use of a vertical pre-fetch random data buffer structure to reduce RND latency and increase RND throughput in a multi-core processor (e.g., SoC including a plurality of processing cores) by way of continually populating the vertical buffer structure with RND (e.g., before core strands or threads make requests for random data) so that the same is ready for consumption upon request from one or more cores. RND received at one data buffer from a higher level buffer is automatically deposited into the lower level buffer if room exists in the lower level buffer or dropped if the lower level buffer is already full.

For instance, the vertical buffer structure may include a "first level" random data pre-fetch buffer on or associated with each core, a plurality of "second level" random data pre-fetch buffers, each of which services a subset of the cores, and a "third level" buffer associated with the RNG and which services the second level buffers. Initially, the RNG may be configured to constantly generate RND which may be temporarily deposited in the third level buffer and then dynamically transmitted upon request to the various second level buffers. Similarly, the RND in each second level buffer may be dynamically transmitted upon request from a core to the first level buffer of the core. Requesting strands of a core may then fetch RND directly from its corresponding first level pre-fetch buffer on demand rather than having to trigger a PIO access to fetch RND from the RNG.

Figure 1:
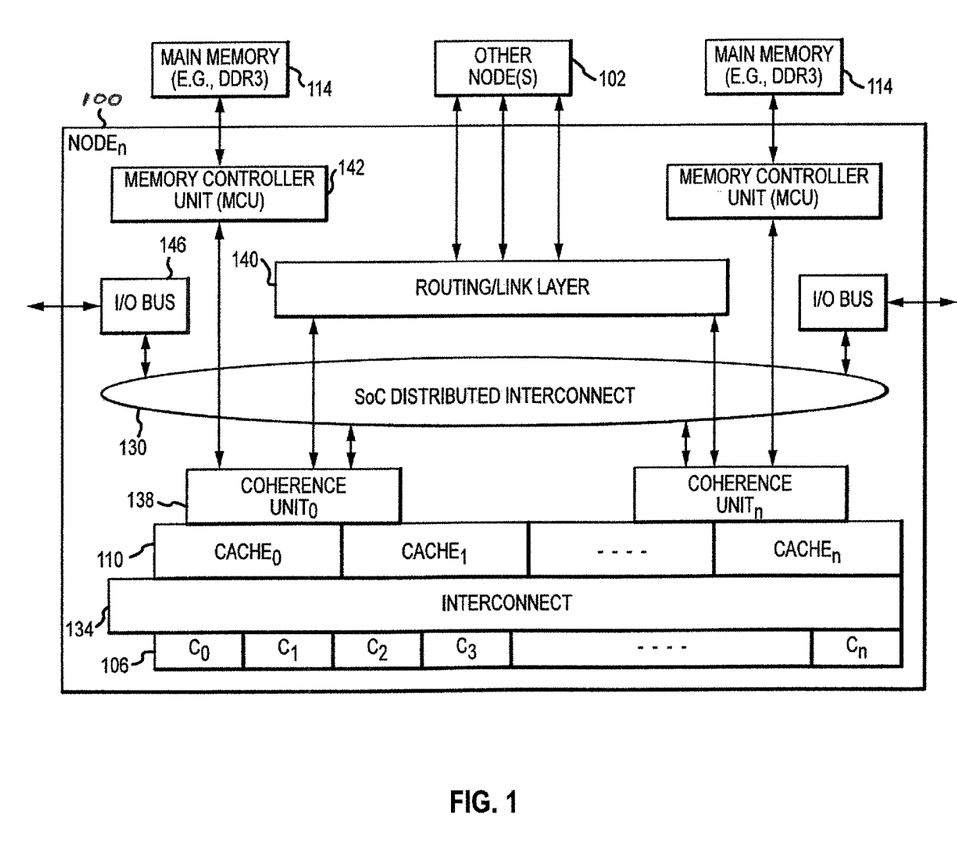
FIG. 1 is a block diagram of a System on a Chip (SoC) that includes a plurality of processing cores.

Before discussing the RND bandwidth acceleration and dynamic allocation utilities disclosed herein in more detail, reference will be initially made to FIG. 1 which illustrates one embodiment of a multicore processor in the form of an SoC 100. The SoC 100 may be implemented on a semiconductor die or chip (e.g., substrate) including an SoC interconnect 130 that broadly serves to electrically/communicatively interconnect a number of the various components and processes of the SoC 100. As shown, the SoC 100 may include a plurality of cores 106 (e.g., $C_0$, $C_1$, $C_2$, and the like) appropriately interconnected to a plurality of caches 110 (e.g., L2 or L3 caches, $Cache_0$, $Cache_1$, and the like) via a "core to cache" interconnect 134 (e.g., crossbar or switch). Each core 106 may generally be operable to fetch "information" (e.g., instructions and/or data) from the one or more caches 110, execute the fetched information, and/or store the information in the one or more caches 110 in a quickly accessible manner. Furthermore, each core 106 may have access to any appropriate memory hierarchy coupled together by one or more busses and other communication interconnects and including main memory 114 along with a number of caches such as a local, L1/L2 cache (not shown) within the core 106, L3 caches (e.g., cache 110), and/or the like. For instance, the caches 110 and/or other caches may be in the form of static random access memories (SRAMs) or DRAMs. Each SoC 100 may include or be assigned one or more particular ranges in address spaces in main memory 114 that may be accessed by the SoC 100 to fetch information for storage in cache or other cache, for execution by cores 106, and the like.

As it is possible to have many copies of a particular instruction or piece of data (e.g., one in main memory, one in one or more caches of an SoC 100, and the like), it may be useful to ensure that changes to one of the copies of the instruction or piece of data are made to all other copies of the instruction or piece of data (e.g., to avoid conflicts, errors, and the like). In this regard, the SoC 100 may include one or more cache "coherence" modules or units 138 (e.g., Coherence Unit$_0$, Coherence Unit$_n$, and the like), each of which is broadly operable for facilitating cache line coherence among one or more caches of the node 100 (e.g., cache 110), one or more caches of other nodes 100, and main memory 114. For instance, each coherence unit 138 may snoop or otherwise communicate with address space 116 in main memory 114 via a memory controller unit (MCU) 142, other SoCs 100 via a routing/link layer 140, and the like.

The SoC 100 may also include an I/O bus 146 as well as other components, logic, processes and the like many of which may not be further discussed herein in the interest of brevity. One additional component is an RNG that is configured to generate RND for consumption by requesting threads of processing cores (e.g., such as for generating random session keys in secure information exchanges and the like) of the SoC 100. Existing manners of obtaining such RND include a requesting thread or strand or a core initiating a PIO access in which the RNG generates random data upon receipt of the PIO access and then returns the generated RND to the core through the same PIO path. However, generating a PIO access and then waiting for the RNG to generate RND and return the same along the same PIO path is a slow process that increases overall system latencies of the SoC 100. In the case of multiple cores simultaneously requesting random data, random data PIO accesses from the various cores are serialized in the RNG hardware which severely degrades RND bandwidth and results in the bandwidth not being fairly to each requesting core.

Figure 2:
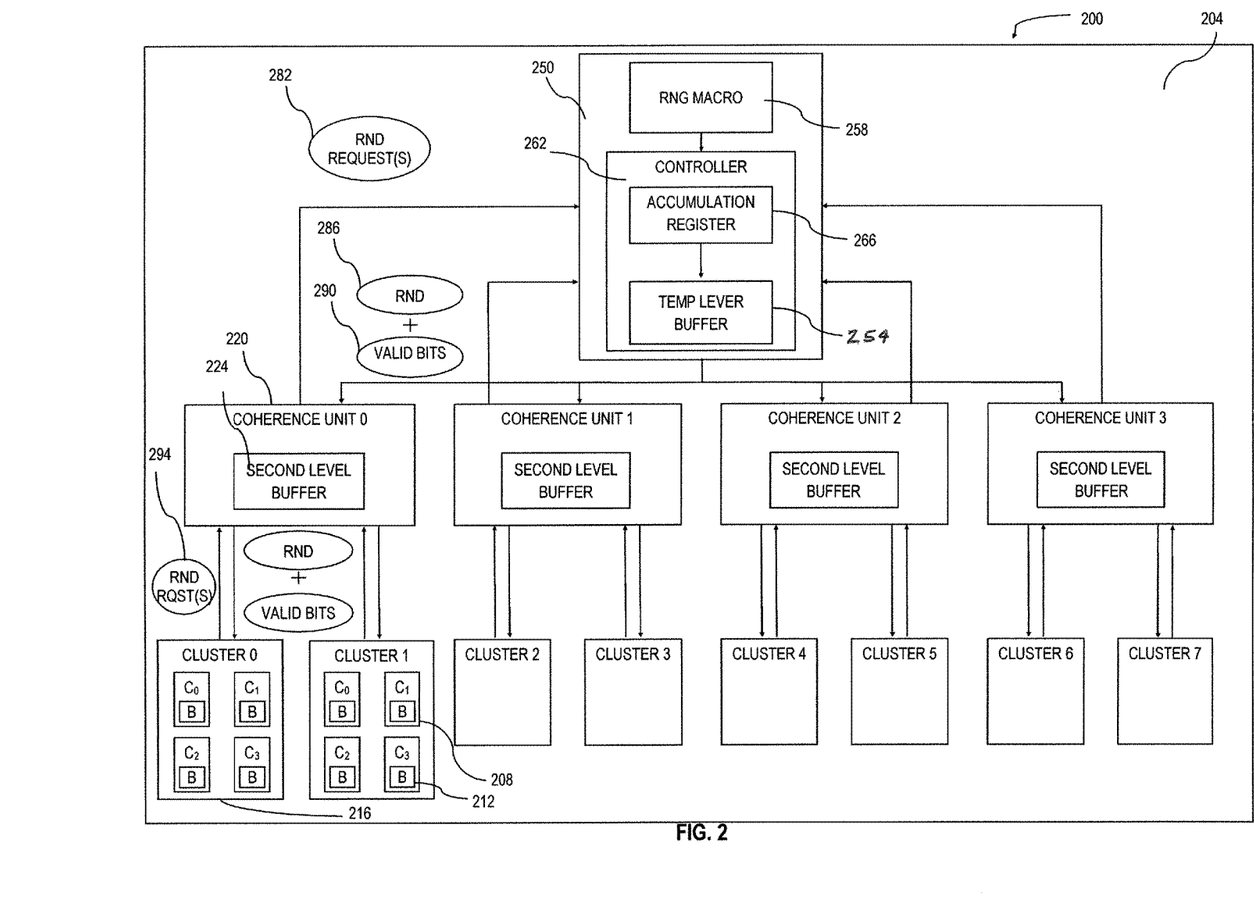
FIG. 2 is a block diagram of an SoC that includes a plurality of processing cores and a random number generator (RNG) as well as a vertical buffer structure that stores RND generated by the RNG for consumption by processing threads of the cores.

In this regard, and turning now to FIG. 2, a schematic block diagram of an SoC 200 is illustrated that is configured to increase RND bandwidth and bit rates in the SoC 200 by buffering RND generated by an RNG 250 in a number of buffers of a vertical RND buffer structure and dynamically allocating RND to buffers in the buffer structure as well as to threads making RND requests from one or more cores of the SoC 200. The SoC 200 may generally include a substrate 204 (e.g., chip, die) on which any appropriate arrangement of processing cores 208 may be disposed for executing program instructions simultaneously to increase overall program speed. In one arrangement, various groups of the cores 208 may be arranged into clusters 216. As shown in FIG. 2, each of a plurality of coherence units 220 disposed on the substrate 204 may be appropriately electrically connected to a subset of the cores 208 (e.g., such as to Cluster$_0$ 216 and Cluster$_1$ 216) for ensuring that changes to copies of instructions or pieces of data in main memory and/or one or more caches (not shown in FIG. 3) available to different ones of the cores 208) are made to all other copies of the instruction or piece of data so as to limit conflicts, errors, and the like.

Each of the coherence units 220 is electrically connected to the RNG 250 for dynamically receiving RND therefrom and dynamically delivering the same to one or more of the cores 208 (e.g., clusters 216) for use by threads thereof as will be discussed in more detail below.

The SoC 200 includes a "vertical" pre-fetch RND buffer structure that is continually populated with RND for consumption by processing core threads to reduce RND latency and increase RND throughput in the SoC 200. The vertical pre-fetch RND buffer structure is made up of a plurality of levels of pre-fetch RND buffers from the RNG 250 down to each respective core 208 of the SoC 200 that function in concert to make RND available for processing threads of the cores 208 substantially immediately upon request. For instance, the vertical pre-fetch RND buffer structure may include a plurality of first level buffers 212 that are respectively disposed in or associated with (e.g., in memory) the plurality of processing cores 208 (not all shown in FIG. 2 in the interest of clarity), a plurality of second level buffers 224 that are respectively disposed in or associated (e.g., in memory) with the plurality of coherence units 220 (not all shown in FIG. 2 in the interest of clarity), and at least one third level buffer 254 disposed in or associated with (e.g., in memory) the RNG 250.

Broadly, RND generated by the RNG 250 is dynamically distributed to one or more of the coherence units 220 for storage in the second level buffers 224, where the RND distributed to one coherence unit 220 may be different than that distributed to all other coherence units 220. As an example, the RNG 250 may include an RNG macro 258 (e.g., RND generation logic) that is configured to generate or obtain RND in any appropriate manner such as via random physical/natural phenomenon, seeded pseudorandom logic, and/or the like. For instance, the generated RND may be in the form of a series of random number sequences or widths, such as a series of 32-bit random numbers. The generated RND may be sent to a controller 262 of the RNG 250 whereby the RND may be temporarily stored in an accumulation register 266 before being moved to the third level buffer 254.

The third level buffer 254 may be in the form of a FIFO buffer memory in which a first sequence or width of RND moved into the FIFO buffer memory is the first sequence of RND moved out of the FIFO buffer memory. As the RNG macro 258 generates RND sequences, the RND sequences may be sequentially moved or transferred into the third level buffer 254 (e.g., via the accumulation register 266), each RND sequence being different from or unique as to all other of the generated RND sequences. The controller 262 may then dynamically distribute each respective RND sequence to one or more of the second level buffers 224 as discussed in more detail herein. In the case where the RNG 250 is running on a first domain bus at a first speed and the various second level buffers 224 are running on a different second domain bus at a different (e.g., slower) speeds, the RNG 250 may implement one or more appropriate synchronizers (e.g., "flip-flop" circuits) to synchronize the bit signals between the different domains. For instance, the third level buffer 254 of the RNG 250 may be implemented with two 32-bit flops and serve as the clock domain crossing (CDC) between the RNG macro 258 and the second level buffers 224.

RND sequences stored in each second level buffer 224 may then be dynamically distributed to a subset of the cores 208 (such as to two clusters 216) for storage in the first level buffers 212 associated with the processing cores 208. In the case where a thread or strand of a particular one of the cores 208 needs RND (e.g., for secret key generation or the like), the thread may just request and obtain the same from its respective first level buffer 212 rather than sending a request for the same to the RNG 250 and then waiting for the RNG to generate and return the same to the thread.

Figure 3:
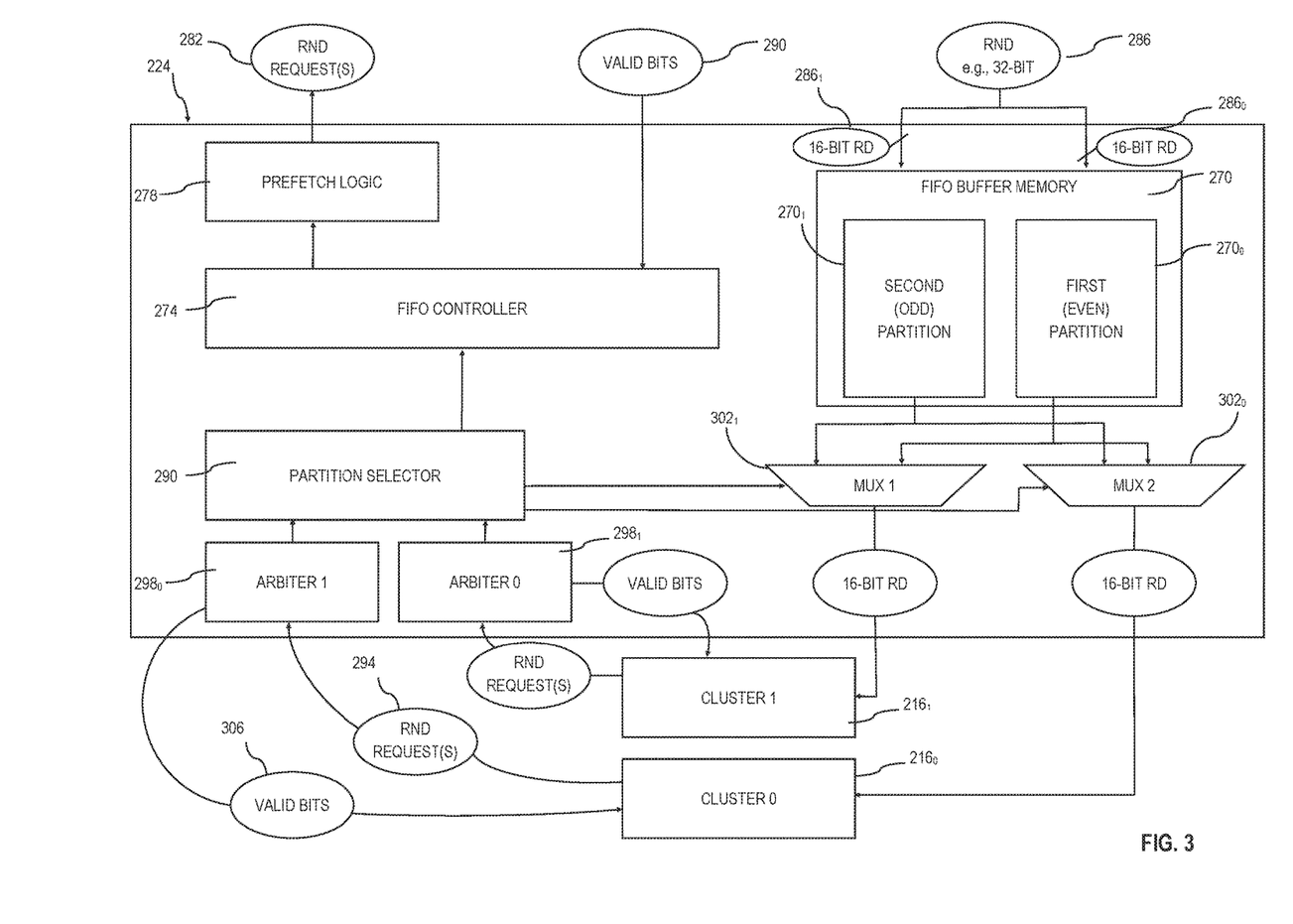
FIG. 3 is a block diagram of a second level buffer of the vertical buffer structure of FIG. 2.
Figure 4:
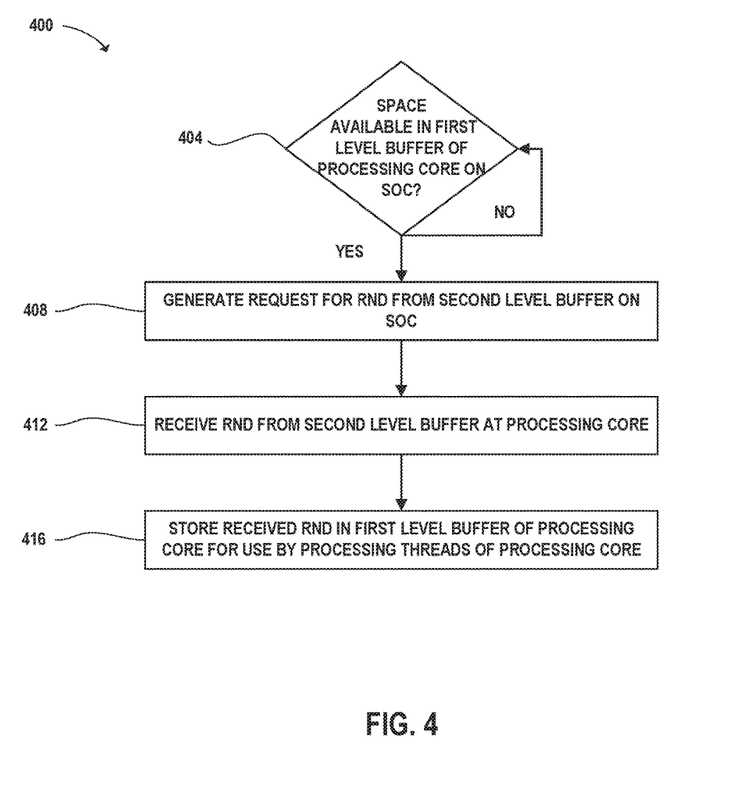
FIG. 4 is a flow diagram of a method of a processing core of the SoC of FIG. 2 requesting and obtaining RND from a corresponding second level buffer of the SoC and storing the RND in its first level buffer.

To further assist the reader in understanding the various utilities disclosed herein, reference will now be made to a series of flow diagrams in conjunction with FIG. 2 as well as FIG. 3 which presents a block diagram of one of the second level buffers of FIG. 2. Starting initially with the flow diagram in FIG. 4, a method 400 includes determining 404 whether space is available in the first level buffer 212 of a processing core 208 on the SoC 200 (it being understood that this method applies to a plurality of the processing cores 208 on the SoC 200 which may implement the method substantially simultaneously or the like). For instance, the processing core 208 may include or execute any appropriate controller or the like (not shown) that is configured to monitor the first level buffer 212 in any appropriate manner and generate 408 RND requests for transmission to its respective second level buffer 224. As discussed, each respective processing core 208 may be assigned to a particular second level buffer 224 so that RND requests from the core 208 may be satisfied by the particular second level buffer 224. Stated differently, each respective second level buffer 224 may service a different respective subset of the processing cores 208 on the SoC 200. As just one example, the second level buffer 224 of the Coherence Unit$_0$ 220 may service $C_0$ (Core$_0$), $C_1$, $C_2$ and $C_3$ 208 of Cluster$_0$ 216 and $C_0$, $C_1$, $C_2$ and $C_3$ 208 of Cluster$_1$ 216. Upon receipt 412 of the RND from the second level buffer 224, the processing core 208 may then store 416 the received RND in its first level buffer 212.

Figure 5:
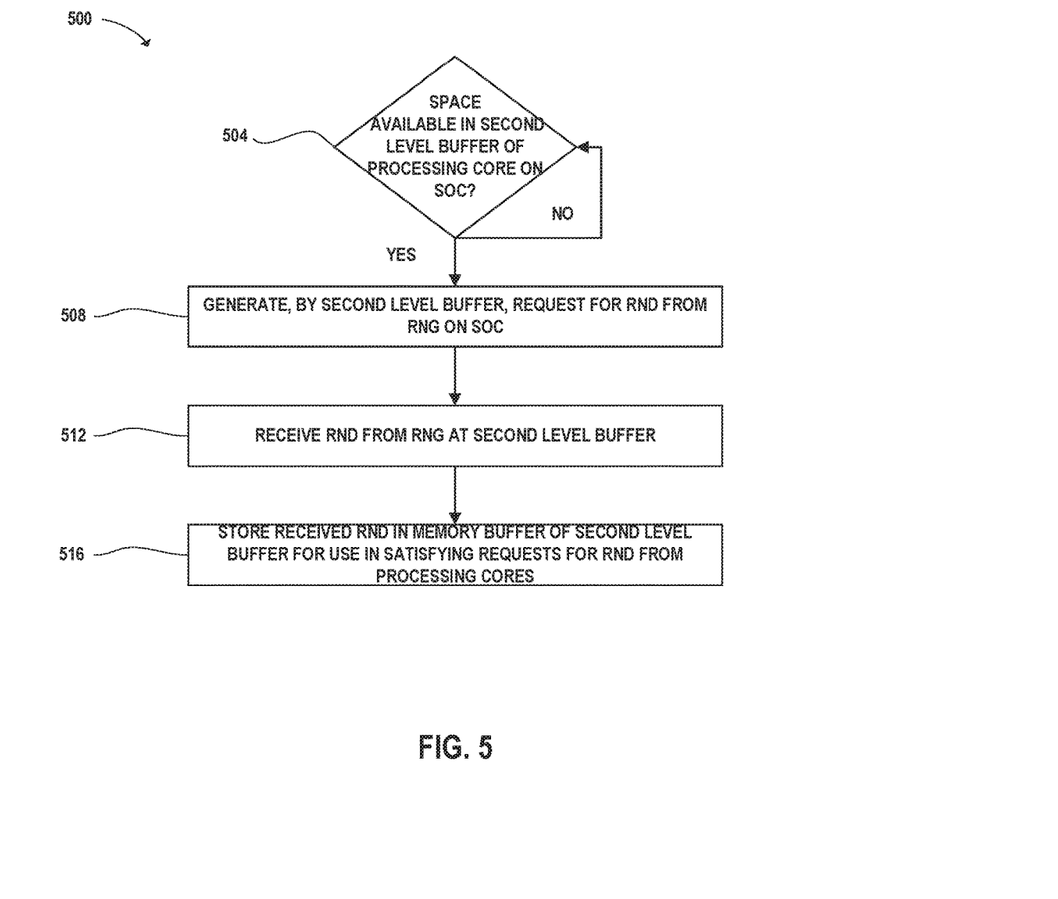
FIG. 5 is a flow diagram of a method of a second level buffer of the SoC of FIGS. 2 and 3 requesting and obtaining RND from the RNG of the SoC and storing the RND in memory buffer.

Before discussing how the second level buffer 224 receives RND requests from processing cores 208 and satisfies the same, reference is made to FIG. 5 which presents a flow diagram of a method 500 implemented by each second level buffer 224 to obtain and store RND. At step 504, a second level buffer 224 may query 504 whether it has space available for storage of additional RND. With reference now to FIG. 3, for instance, each second level buffer 224 may include a memory buffer 270 that is configured to store RND as well as a controller 274 that is configured to monitor the memory buffer 270 in any appropriate manner as part of performing the query 504 step. As an example, the controller 274 may be configured to determine that the memory buffer 270 has additional storage space when RND has been transmitted from the memory buffer 270 for distribution to one or more processing cores 208. In another arrangement, the controller 274 may be configured to continuously ping the memory range representing the memory buffer 270 to determine whether or not RND is located at substantially every address in the memory range.

In any case, the controller 270 may, upon determining that space is available in the memory buffer 274 for additional RND, trigger any appropriate prefetching logic 278 or the like to generate 508 one or more RND requests 282 and transmit the same to the RNG 250. Upon receipt 512 of RND 286 from the RNG 250 in response to the RND request(s) 282, the second level buffer 224 may then store 516 the same in the memory buffer 270 for use in satisfying RND requests from processing cores 208 (discussed below). In one arrangement, the prefetching logic 278 may continuously (e.g., during every clock cycle, every fourth clock cycle, etc.) send RND requests 282 to the RNG 250 until receiving another trigger from the controller 274 to stop sending such RND requests 282 (e.g., upon the controller 274 determining that space is not available in the buffer memory 270 for any additional RND 286 at the moment). RND 286 received at the second level buffer 224 after the controller 274 has triggered the prefetching logic 278 to stop requesting RND may be dropped instead of stored in the buffer memory 270. In another arrangement, the prefetching logic 278 may only generate an RND request 282 when it is specifically triggered during each of one or more clock cycles by the controller 274.

Referring back to FIG. 2, RND requests 282 may be received by the controller 262 of the RNG 250 which may proceed to access the third level buffer 254 to retrieve RND 286 and send the same to the requesting second level buffer 224. In the arrangement where the third level buffer 254 is in the form of a FIFO memory buffer, the controller 262 may obtain and transmit the oldest RND 286 in the third level buffer 254 to the requesting second level buffer 224. In one arrangement, the RNG 250 may be electrically connected to each of the coherence units 220 (e.g., each of the second level buffers 224) on a common domain bus or interface (e.g., a 32-bit system domain bus) to simplify the fabrication process among other efficiencies. See FIG. 2. When sending the RND 286 to the requesting second level buffer 224, the controller 262 may distribute the RND 286 in addition to a "valid" bit 290 over the common domain bus to all of the second level buffers 224, where the controller configures the valid bit into an "on" configuration (e.g., a "1") with the RND going to the requesting second level buffer 224 and configures the valid bid into an "off" configuration (e.g., a "0") with the RND going to the remaining second level buffers 224.

With reference again to FIG. 3, RND 286 and corresponding valid bits 290 are received by each second level buffer 224. In the case of the requesting second level buffer 224, the controller 274 thereof determines that the valid bit 290 is in an on configuration and therefore triggers storage of the corresponding RND 286 in the buffer memory 270. In the case of the non-requesting second level buffers 224, the controllers 274 thereof determines that the valid bit 290 is in an off configuration and therefore automatically drops the RND 286 to prevent storage of the corresponding RND 286 in the buffer memories 270 thereof.

In the case where the RNG 250 receives two or more RND requests 282 from two or more second level buffers 224, the controller 262 may be configured to address and satisfy each request in the order in which it was received at the controller 262, such as during sequential clock cycles of the SoC or the like. In one arrangement, the RNG 250 may be configured to constantly generate RND 286 and send the same out to the second level buffers 224 over the common domain bus (e.g., during every clock cycle, during every fourth clock cycle, etc.) whether or not any second level buffers 224 have actually requested RND. In the situation where no second level buffers 224 have requested RND during a particular clock cycle, the controller 262 may simply configure the corresponding valid bit 290 sent to each of the second level buffers 224 into the off configuration whereupon the second level buffers 224 would just drop the RND 286 rather than storing the same in the buffer memories 270.

With reference again to FIG. 3 and in the situation where the controller 274 of a particular second level buffer 224 determines that the corresponding valid bit 290 is on, the received RND may be divided into first and second portions $286_0$, $286_1$ which may be respectively stored in first and second partitions $270_0$, $270_1$ of the buffer memory 270. As one example, buffer memory 270 may be in the form of a 4×32 FIFO buffer memory (e.g., capable of simultaneously handling four, 32-bit streams or sequences of RND) that includes a first or lower half/partition $270_0$ that is configured to store one half of an incoming stream (e.g., width) of RND from the RNG 250 (e.g., 16 bits, such as bit[15:0]) and a second or upper half/partition $270_0$ that is configured to store another half of the incoming stream (e.g., width) of RND from the RNG 250 (e.g., 16 bits, such as bit[31:16]). Over time, the first partition $270_0$ may thus fill up with the first portions $286_0$ (e.g., first halves) of the incoming RND sequences received from the RNG 250 while the second partition $270_1$ may thus fill up with the second portions $286_1$ (e.g., second halves) of the incoming RND sequences received from the RNG 250. This arrangement advantageously increases RND bandwidth and reduces RND latencies as will be appreciated in the ensuing discussion.

Figure 6:
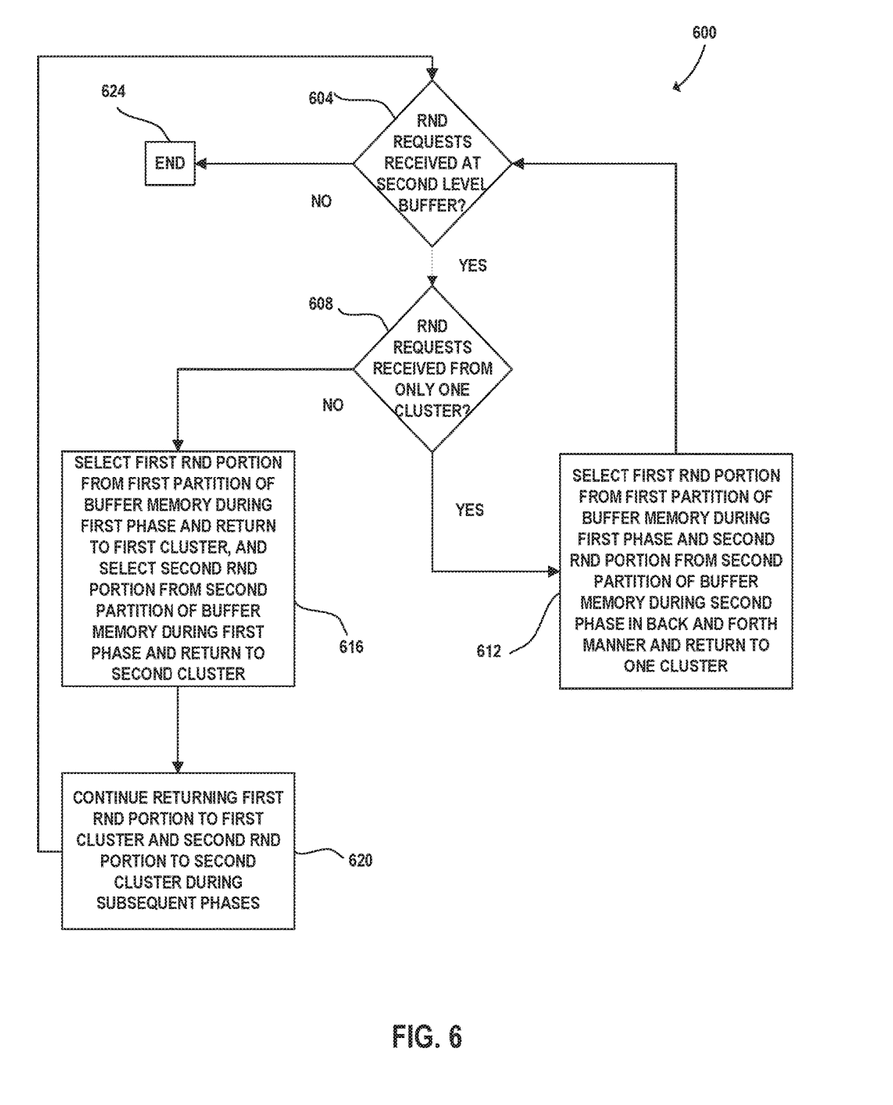
FIG. 6 is a flow diagram of a method of a second level buffer of the SoC of FIGS. 2 and 3 receiving RND requests from processor cores of the SoC and delivering RND to the requesting processor cores.

FIG. 6 presents a flow diagram of a method 600 of receiving RND requests 294 from processing cores 208 at their respective second level buffer 224 and satisfying the same. At step 604, the method 600 may query whether RND requests 294 have been received from processing cores 208 at the second level buffer 224. As an example, RND requests 294 may be received at the second level buffer 224 from one or more processing cores 208 of one or both of the processing clusters 216 assigned to this second level buffer 224, such as from $Cluster_0$ $216_0$ and/or $Cluster_1$ $216_1$. In one arrangement and as shown in FIG. 3, the second level buffer 224 may include a different respective arbiter 298 (e.g., logic) for each respective cluster 216, where each arbiter 298 is configured to serve as an interface to the second level buffer 224 for its respective cluster 216 for use in receiving RND requests 294 from one or more cores 208 of the cluster 216 and facilitating transfer of RND 286 to the one or more requesting cores 208 of the cluster 216.

Responsive to a positive answer to the query 604, the method 600 may then query 608 whether the RND requests 294 are received from one or more processing cores 208 from only one cluster 216 (e.g., from just $Cluster_0$ 216 or from just $Cluster_1$ 216) or whether the RND requests 294 are received from more than one cluster (e.g., from both $Cluster_0$ 216 and $Cluster_1$ 216). For instance, the second level buffer 224 may include a random data or partition selector 290 (e.g. logic) that is configured to receive RND requests 294 from the arbiters 298 and make the query 608. In the event of a positive answer to the query 608, the second level buffer 224 (e.g., the partition selector 290) may proceed to select a first RND portion $286_0$ (e.g., first RND half) from the first buffer memory partition $270_0$ during a first phase (e.g., first clock cycle) and facilitate transmission of the same to the one cluster 216 and then a second RND portion $286_1$ (e.g., second RND half) from the second buffer memory partition $270_1$ during a subsequent second phase (e.g., second clock cycle) and facilitate transmission of the same to the one cluster 216.

The partition selector 290 may continue selecting first and second RND portions $286_0$, $286_1$ in the above "ping-ponging" fashion and facilitating transmission of each portion to the one cluster 216 until it is again determined at step 604 that no further RND requests 294 are being received at the second level buffer 224 (and at which point the process may end at 624). This arrangement advantageously conserves RND bandwidth by transmitting smaller RND portions to the cluster 216 (e.g., sequential 16-bit sequences) than that initially received (e.g., 32-bit sequence) at the second level buffer 224 from the RNG 250. Furthermore, such smaller RND portions can be easier for the requesting core 208 of the cluster 216 to manipulate, process, and/or the like. Still further, continuously transmitting the small first and second RND portions $286_0$, $286_1$ from the first and second partitions $270_0$, $270_1$ during sequential clock cycles allows the second level buffer 224 to transmit RND 286 to the cluster 216 (e.g., to the requesting processing core 208) faster than if the second level buffer 224 transferred only first RND portions $286_0$ from the first partition $270_0$ or only second RND portions $286_1$ from the second partition $270_1$ (e.g., in which case the second level buffer 224 would only be able to transfer such RND portions every second or greater clock cycle or in other words at lower frequencies if one or more other core clusters also make RND requests through other second level buffers).

In one arrangement, the second level buffer 224 may include a different respective multiplexer 302 (e.g., logic) for each respective cluster 216, where each multiplexer 302 is configured to select RND from one of the first and second partitions $270_0$, $270_1$ (based on commands from the partition selector 290 depending on the particular phase/cycle of the SoC 200) and send the same to its respective cluster 216 (e.g., to all of the processing cores 208 of the cluster even if only one of the cores 208 is requesting RND). In conjunction with the partition selector 290 triggering the particular multiplexer 302 to send RND 286 to its respective cluster 216, the arbiter 298 of the respective cluster 216 may generate and send valid bits 306 to all of the cores 208 of the cluster 216, where the valid bit of the processing core 208 requesting the RND is turned on and that of the other non-requesting cores 208 in the cluster 216 is turned off. The second level buffer 224 may synchronize the sending of particular RND 286 and a respective particular valid bit 306 so that upon receipt, each processing core 208 of the cluster 216 (e.g., a controller of the processing core 208) can readily determine whether to store the RND 286 in its first level buffer 212 (when the valid bit is turned on) or drop and not store the RND 286 (when the valid bit is turned off).

With reference again to FIG. 6, the method 600 may flow back to query 604 whether RND requests are being received at the second level buffer and then, assuming they are, query 608 (e.g., by the partition selector 290) whether the RND requests are still being received from only the one cluster. Assuming the RND requests are still being received from the one cluster, the method 600 may continue selecting 612 the first and second RND portions $286_0$, $286_1$ from the first and second partitions $270_0$, $270_1$. In the case where requests are being received from two or more processing cores 208 of only one cluster 216, the corresponding arbiter may use any appropriate arbitration scheme to distribute the RND portions to the requesting cores 208 (e.g., round robin, order in which request received at arbiter, etc.). For instance, assuming that $C_0$ 208 and $C_3$ 208 of $Cluster_0$ 216 have made RND requests and that $arbiter_0$ $298_0$ has determined that $C_3$ 208 is to receive an RND portion first, the $Arbiter_0$ $298_0$ may configure the valid bit 306 being sent to $C_3$ 208 with the first received RND portion (either from the first or second partition $270_0$, $270_1$) into an on configuration and the valid bit 306 being sent to the other cores ($C_0$, $C_1$, $C_2$ 208) into an off configuration (so that cores $C_0$, $C_1$, $C_2$ 208 drop the first received RND portion). During a next or subsequent clock cycle or phase, the $Arbiter_0$ $298_0$ may configure the valid bit 306 being sent to $C_0$ 208 with the second received RND portion (from the other of the first or second partition $270_0$, $270_1$) into an on configuration and the valid bit 306 being sent to the other cores ($C_1$, $C_2$, $C_3$ 208) into an off configuration. In the event that additional cores 208 of the one cluster 216 make RND requests, the corresponding arbiter may similarly distribute RND to such additional cores.

If it is determined at 608 (e.g., by the partition selector 290) that the RND requests are now being received by more than one cluster 216 (e.g., $Cluster_0$ 216 and $Cluster_1$ 216), the method 600 may proceed to step 616 whereby first RND portions $286_0$ may be selected from the first partition $270_0$ and returned to the first cluster (e.g., $Cluster_0$ 216) and second RND portions $286_1$ may be selected from the second partition $270_1$ and returned to the second cluster (e.g., $Cluster_1$ 216) during the same cycle or phase, and then continue 620 to do so during subsequent cycles or phases. In other words, the first RND portions $286_0$ may be sent to only one of the clusters (e.g., $Cluster_0$ 216) and the second RND portions $286_1$ may be sent to only a different one of the clusters (e.g., $Cluster_1$ 216). For instance, the partition selector 290 may instruct $Multiplexer_0$ $302_0$ to select only first RND portions $286_0$ from the first partition $270_0$ and send the same to the $Cluster_0$ 216 and instruct $Multiplexer_1$ $302_1$ to select only second RND portions $286_1$ from the second partition $270_1$ and send the same to the $Cluster_1$ 216. The respective arbiters 298 may configure valid bits 306 being sent to the respective clusters 216 in conjunction with the particular RND portions being sent by the multiplexers 302 in on or off configurations as discussed previously so that only the requesting cores 208 store the RND portions in their respective first level buffers 212 during each cycle pursuant to any appropriate arbitration scheme implemented by the arbiters.

In some scenarios, a processing core 208 from one cluster 216 (e.g., $Cluster_1$ 216) may make an RND request 294 of the second level buffer 224 when a processing core 208 from another cluster (e.g., $Cluster_0$ 216) is already making RND requests 294 and receiving RND 286 from the second level buffer 224. That is, it may be the case that the partition selector 290 is in the process of selecting first and second RND portions $286_0$, $286_1$ in the above-discussed "ping-ponging" fashion and facilitating transmission of the same to one cluster 216 when another cluster now needs to be serviced with RND. In some embodiments, the partition selector 290 may simply instruct the multiplexer 302 of the junior requesting cluster 216 (i.e., the second/later requesting cluster 216) to select RND portions 286 from the one of the first and second partitions $270_0$, $270_1$ not being currently selected by the multiplexer 302 of the senior requesting cluster 216 (i.e., the first/earlier requesting cluster 216) and instruct the multiplexer 302 of the senior requesting cluster 216 to continue selecting RND portion 286 from the one of the first and second partitions $270_0$, $270_1$ that it is currently selecting (and continue in this manner per step 620 in FIG. 6).

In other embodiments, $Cluster_0$ 216 may be configured to only receive RND portions 286 from the first partition $270_0$ (or vice versa) and $Cluster_1$ 216 may be configured to only receive RND portions 286 from the second partition $270_1$ (or vice versa) when both $Cluster_0$ 216 and $Cluster_1$ 216 are simultaneously requesting RND from the second level buffer 224. In this regard, if the multiplexer 302 of $Cluster_0$ 216 as the senior requesting cluster 216 is currently selecting an RND portion 286 from the second partition $270_1$ when $Cluster_1$ 216 makes an RND request 294, the partition selector 290 may defer or wait for one or more clock cycles until the multiplexer 302 of $Cluster_0$ 216 has completed selecting and sending an RND portion 286 from the second partition $270_1$ before instructing the multiplexer 302 of $Cluster_1$ 216 to do so. Thereafter, the partition selector 290 may continue simultaneously instructing the multiplexer 302 of $Cluster_0$ 216 to select only RND portions 286 from first partition $270_0$ and multiplexer 302 of $Cluster_1$ 216 to select only RND portions 286 from second partition $270_1$ during each clock cycle. Each of the various second level buffers 224 of the SoC 200 may independently operate as discussed herein to service RND requests from its one or more corresponding clusters 216.

With reference to FIG. 2, the various components of the SoC 200 may be configured to operate on different domain buses at different speeds. As a non-limiting example, the RNG macro 258 may be configured to generate RND 286 at a first speed on one domain bus while the second level buffers 224 may be configured to operate at a slower second speed on one or more other domain buses (e.g., (a) system domain bus(es)). For instance, a 32-bit system domain bus may interconnect the controller 262 of the RNG 250 to each of the second level buffers 224 while a different respective 16-bit system domain bus may interconnect each second level buffer 224 to its respective one or more clusters 216 (e.g., to the first level buffers 216 of the cores 208 of the clusters 216). To accommodate transmission of data and requests across different domain buses at different clock speeds, any appropriate synchronizers may be used at such clock domain crossings (CDC) such as flip flop circuits or the like. For instance the third level buffer 254 of the RNG 250 may be in the form of a FIFO buffer memory implemented with two 32-bit flops to serve as the CDC between the RNG macro 258 and the second level buffers 224.

In one arrangement, each processing core 208 may be configured to incorporate a user level instruction to read a random number of a particular number of bits from its first level buffer 212. For instance, in the case where the core 208 needs a 64-bit random number and the first level buffer 212 includes a plurality of 16-bit random numbers, the core may be configured to obtain four of the 16-bit random numbers from its first level buffer 212 and assemble the same into a 64-bit random number.

It will be readily appreciated that many deviations may be made from the specific embodiments disclosed in the specification without departing from the spirit and scope of the invention. For instance, while the disclosed SoC 200 has been discussed and illustrated as having four second level buffers 224 that each service two clusters 216, where each cluster 216 includes four cores 208, it is to be understood that the utilities disclosed herein are applicable to other arrangements and number of second level buffers 224, clusters, 216, and the like. Furthermore, while the vertical buffer structure has been disclosed as having three different buffer levels, it is envisioned that additional or different numbers of buffer levels may be incorporated to store and make available RND for processing cores 208. Still further, while the buffer memory 270 of each second level buffer 224 has been illustrated as having two partitions that each store half of an incoming RND sequence, it is to be understood that a single partition or more than two partitions or additional data processing could be accommodated. For instance, in the case where 64-bit RND was received at a second level buffer 224, such 64-bit RND could be divided into four 16-bit RND portions that could be deposited into four respective memory buffer partitions. Various other arrangements are envisioned and encompassed herein.

While each second level buffer 224 has been illustrated as being encompassed within a respective coherence unit 220 of the SoC 200, this need not necessarily be the case and the second level buffers 224 may be separate from or not associated with coherence units 220 in other embodiments. In some arrangements, the SoC 200 may be able to accommodate requests for RND from processor cores under both the utilities disclosed herein as well as under legacy or previous manners of doing so (e.g., via PIO accesses discussed previously herein). With reference to FIG. 2, for instance, any appropriate logic or the like may be incorporated into the SoC 200 that is configured to handle both legacy RND requests and the new RND requests disclosed herein and ensure that the same piece, sequence or portion of RND 286 generated by the RNG 250 is not stored by more than one second level buffer 224, more than one cluster 216, more than one core 208, etc. It is to be understood that not all components, modules and the like of the SoC 200 have been shown in the figures in the interest of clarity. Furthermore, the process flows of FIGS. 4-6 have merely been provided as examples of process flows and that such flows may sometimes include more, fewer, or different steps than shown in the figures.

As mentioned, embodiments disclosed herein can be implemented as one or more computer program products, i.e., one or more modules of computer program instructions encoded on a computer-readable medium for execution by, or to control the operation of, data processing apparatus (processors, cores, etc.). The computer-readable medium can be a machine-readable storage device, a machine-readable storage substrate, a memory device, a composition of matter affecting a machine-readable propagated signal, or a combination of one or more of them. In addition to hardware, code that creates an execution environment for the computer program in question may be provided, e.g., code that constitutes processor firmware, a protocol stack, a database management system, an operating system, or a combination of one or more of them.

Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

We claim:

1. A system on a chip (SoC), comprising:
a substrate;
a random number generator (RNG) on the substrate that generates random number data (RND); and
a plurality of data buffers on the substrate,
wherein each data buffer includes a plurality of memory partitions that are each configured to store a different portion of an RND sequence received from the RNG during each clock cycle of the SoC, and
wherein each data buffer includes:
fetching logic for generating requests for RND from the RNG; and
a controller that monitors the memory partitions and triggers the fetching logic to generate an RND request when the controller determines the memory partitions are not full.

2. The SoC of claim 1, wherein the RNG generates and distributes 32-bit RND, and wherein the plurality of memory partitions includes a first partition that is configured to store a first 16 bits of the 32-bit RND and a second partition that is configured to store a second 16 bits of the 32-bit RND.

3. The SoC of claim 1, further including:
a plurality of processing cores on the substrate, wherein each processing core includes a first level data buffer, wherein the plurality of data buffers are a plurality of second level data buffers, and wherein each first level data buffer is configured to receive RND from one of the second level data buffers for consumption by processing threads of its respective processing core.

4. The SoC of claim 3, wherein each second level data buffer is configured to store RND for consumption by a different subset of the plurality of processing cores, and wherein each second level data buffer includes a random data selector that is configured to select the different portion of the RND sequence from at least one of the plurality of partitions and send the same for distribution to at least one of the different subsets of processing cores.

5. The SoC of claim 4, wherein the random data selector is configured to alternatingly select the different portions of the RND sequence from the plurality of partitions during sequential clock cycles of the SoC and send the different portions for distribution to one of the different subsets of processing cores.

6. The SoC of claim 4, wherein the random data selector is configured to select first different portions of the RND sequence from a first of the partitions and send the first different portions to a first of the different subsets of processing cores partitions during first clock cycles of the SoC, and wherein the random data selector is configured to select second different portions of the RND sequence from a second of the partitions and send the second different portions to a second of the different subsets of processing cores partitions during alternating second clock cycles of the SoC.

7. The SoC of claim 4, wherein each second level data buffer includes a plurality of arbiters interposed between the random data selector and the plurality of subsets of processing cores, wherein each arbiter is disposed between the random data selector and a different one of the subsets of processing cores, and wherein each arbiter is configured to receive RND requests from cores of its respective subset of processing cores and then facilitate transfer of RND from at least one of the memory partitions back to the requesting cores.

8. The SoC of claim 1, wherein the RNG includes:
random number generation logic for generating random number data; and
a third level buffer for storing the RND generated by the random number generation logic for distribution to the plurality of data buffers.

9. A method for use in a multicore processor, comprising:
ascertaining, by one of a plurality of random number data (RND) pre-fetch buffers of a multicore processor, that space is available in a random data memory buffer of the one of the RND pre-fetch buffers;
requesting, by the one of the RND pre-fetch buffers in response to the ascertaining, RND from a random number generator (RNG) on the multicore processor that services the plurality of RND pre-fetch buffers;
receiving, by the one of the RND pre-fetch buffers from the RNG in response to the requesting by the one of the RND pre-fetch buffers, RND; and
storing the received RND in the random data memory buffer of the one of the RND pre-fetch buffers.

10. The method of claim 9, wherein the storing of the received RND in the random data memory buffer of the one of the RND pre-fetch buffers includes:
storing a first portion of a width of the RND in a first partition of the random data memory buffer of the one of the RND pre-fetch buffers; and storing a second portion of a width of the RND in a second partition of the random data memory buffer of the one of the RND pre-fetch buffers.

11. The method of claim 10, further including:
receiving, at the one of the RND pre-fetch buffers, a request from a first of a plurality of processing cores of the multicore processor for RND; and
returning to the first processing core, in response to the request received from the first processing core, the first portion of the width of the RND from the first partition of the random data memory buffer.

12. The method of claim 11, further including:
returning to the first processing core, in response to the request received from the first processing core, the second portion of the width of the RND from the second partition of the random data memory buffer.

13. The method of claim 12, wherein the returning of the first portion of the width of the RND from the first partition of the random data memory buffer occurs during a first clock cycle of the multicore processor, and wherein the returning of the second portion of the width of the RND from the second partition of the random data memory buffer occurs during a subsequent clock cycle of the multicore processor.

14. The method of claim 11, further including:
receiving, at the one of the RND pre-fetch buffers, a request from a second of the plurality of processing cores for RND; and
returning to the second processing core, in response to the request received from the second processing core, the second portion of the width of the RND from the second partition of the random data memory buffer.

15. The method of claim 14, wherein the returning of the first portion of the width of the RND from the first partition of the random data memory buffer to the first processing core occurs during a first clock cycle of the multicore processor, wherein the returning of the second portion of the width of the RND from the second partition of the random data memory buffer to the second processing core occurs during the first clock cycle of the multicore processor.

16. The method of claim 15, wherein the first processing core is in a first core cluster of the multicore processor, and wherein the second processing core is in a second core cluster of the multicore processor.

17. A system on a chip (SoC), comprising:
a substrate;
a random number generator (RNG) on the substrate that generates random number data (RND);
a plurality of data buffers on the substrate, wherein each data buffer includes a plurality of memory partitions that are each configured to store a different portion of an RND sequence received from the RNG during each clock cycle of the SoC; and
a plurality of processing cores on the substrate,
wherein each processing core includes a first level data buffer,
wherein the plurality of data buffers is a plurality of second level data buffers,
wherein each first level data buffer is configured to receive RND from one of the second level data buffers for consumption by processing threads of its respective processing core,
wherein each second level data buffer is configured to store RND for consumption by a different subset of the plurality of processing cores, and
wherein each second level data buffer includes a random data selector that is configured to select the different portion of the RND sequence from at least one of the plurality of partitions and send the same for distribution to at least one of the different subsets of processing cores.

18. The SoC of claim 17, wherein the RNG generates and distributes 32-bit RND, and wherein the plurality of memory partitions includes a first partition that is configured to store a first 16 bits of the 32-bit RND and a second partition that is configured to store a second 16 bits of the 32-bit RND.

19. The SoC of claim 17, wherein each data buffer includes:
fetching logic for generating requests for RND from the RNG; and
a controller that monitors the memory partitions and triggers the fetching logic to generate an RND request when the controller determines the memory partitions are not full.

20. The SoC of claim 17, wherein the random data selector is configured to alternatingly select the different portions of the RND sequence from the plurality of partitions during sequential clock cycles of the SoC and send the different portions for distribution to one of the different subsets of processing cores.

21. The SoC of claim 17, wherein the random data selector is configured to select first different portions of the RND sequence from a first of the partitions and send the first different portions to a first of the different subsets of processing cores partitions during first clock cycles of the SoC, and wherein the random data selector is configured to select second different portions of the RND sequence from a second of the partitions and send the second different portions to a second of the different subsets of processing cores partitions during alternating second clock cycles of the SoC.

22. The SoC of claim 17, wherein each second level data buffer includes a plurality of arbiters interposed between the random data selector and the plurality of subsets of processing cores, wherein each arbiter is disposed between the random data selector and a different one of the subsets of processing cores, and wherein each arbiter is configured to receive RND requests from cores of its respective subset of processing cores and then facilitate transfer of RND from at least one of the memory partitions back to the requesting cores.

23. The SoC of claim 17, wherein the RNG includes:
random number generation logic for generating random number data; and
a third level buffer for storing the RND generated by the random number generation logic for distribution to the plurality of data buffers.

* * * * *

UNITED STATES PATENT AND TRADEMARK OFFICE
CERTIFICATE OF CORRECTION

PATENT NO.        : 10,289,331 B2  
APPLICATION NO.   : 16/143013  
DATED             : May 14, 2019  
INVENTOR(S)       : Chang et al.

Page 1 of 1

It is certified that error appears in the above-identified patent and that said Letters Patent is hereby corrected as shown below:

On the Title Page

Item (72), Column 1, under Inventors, Line 3, delete "CA (US)" and insert -- TX (US) --, therefor.

Signed and Sealed this
Twenty-first Day of July, 2020

Andrei Iancu
*Director of the United States Patent and Trademark Office*